Figure 1:
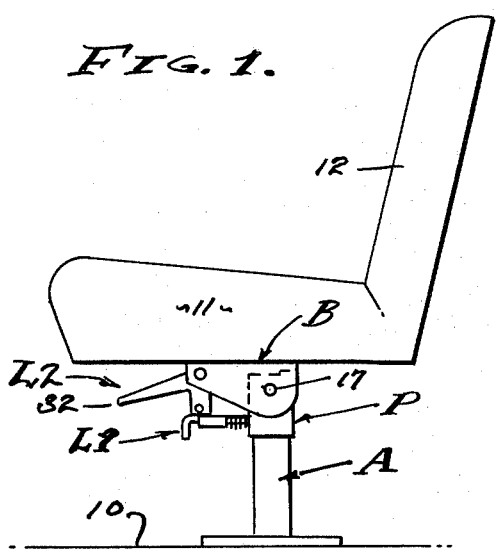

United States Patent [19]
McKee

[11] 3,975,050
[45] Aug. 17, 1976

[54] TILTING SWIVEL CHAIR SUPPORT

[76] Inventor: Dale P. McKee, 1722 Armstead, Grand Prairie, Tex. 75050

[22] Filed: May 14, 1975

[21] Appl. No.: 577,414

[52] U.S. Cl. .............................. 297/328; 248/371; 248/418; 297/349
[51] Int. Cl.² ...................... A47C 1/02; A47C 3/00
[58] Field of Search ............... 27/328, 349, 327; 248/397, 415, 418, 382, 384, 371, 409, 408

[56] References Cited
UNITED STATES PATENTS

| 133,721 | 12/1872 | Kapp | 297/328 X |
|---|---|---|---|
| 304,876 | 9/1884 | Wallace et al. | 297/328 |
| 491,098 | 2/1893 | Gould | 297/328 |
| 2,319,700 | 5/1943 | Miller et al. | 297/328 |
| 2,334,193 | 11/1943 | Hedeen et al. | 248/418 |
| 3,603,553 | 9/1971 | Doerner | 248/384 |
| 3,708,203 | 1/1973 | Barecki et al. | 248/408 |
| 3,873,054 | 3/1975 | McKee et al. | 248/418 |

*Primary Examiner*—James T. McCall

[57] ABSTRACT

A unit of hardware for reclinably adjustable seating of vehicle driver and/or passenger and adapted to be swiveled into selected position, and comprising a pedestal rotatably receiving a socket positionably locked thereto, and a stop plate positionably locked in reclined positions by a toggle pin carried into tight engagement therewith by a manually releasable lever operated shackle, the tilt being positively restricted.

6 Claims, 6 Drawing Figures

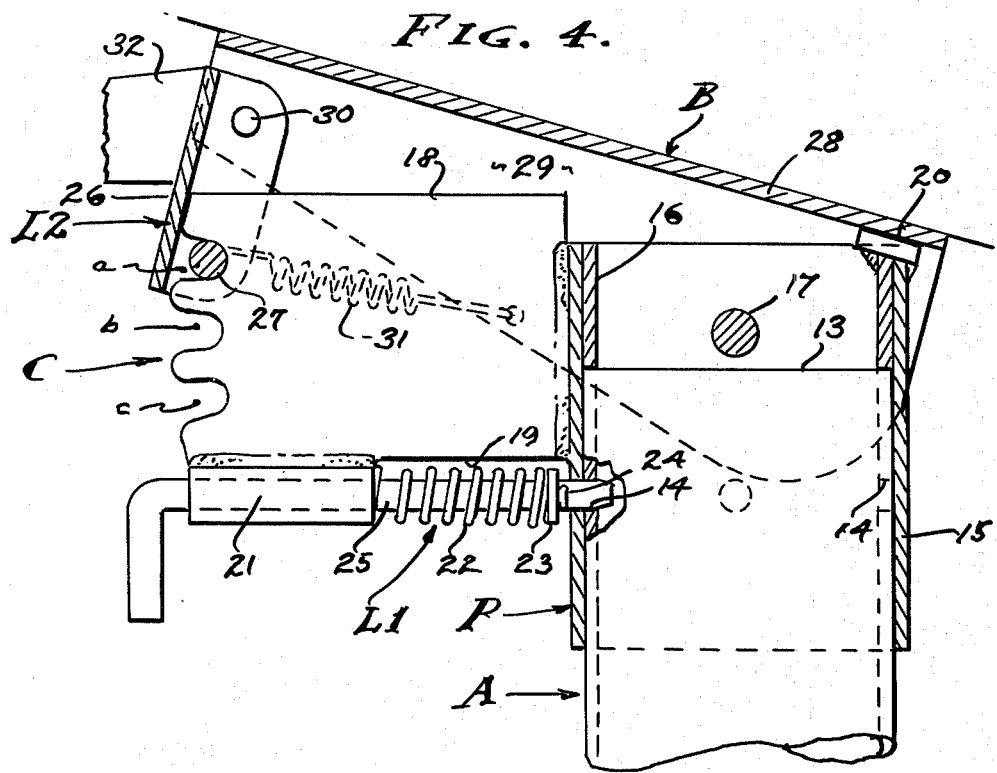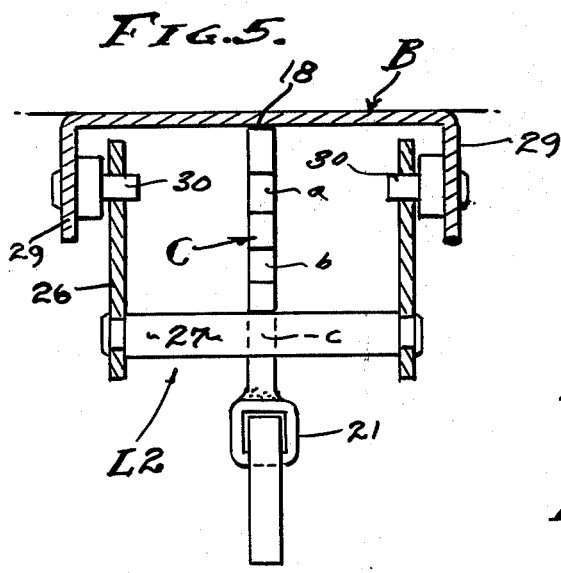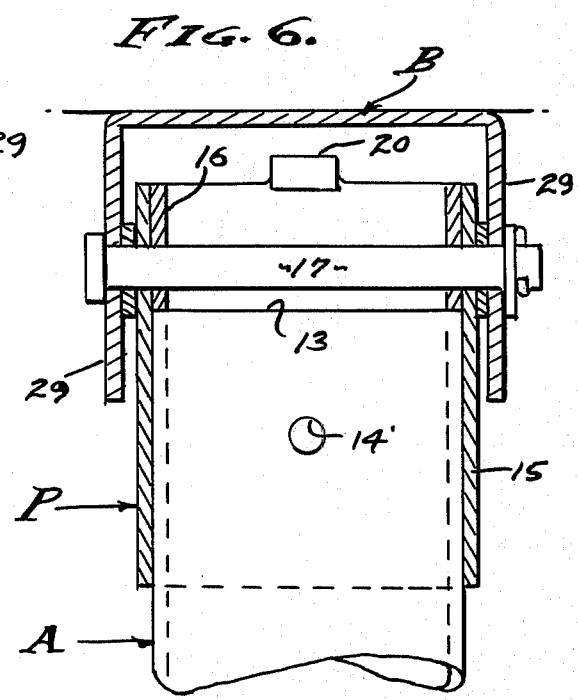

TILTING SWIVEL CHAIR SUPPORT

BACKGROUND

This invention relates to seating hardware for use in the furnishing of motor homes and like vehicles, and in particular to front seating for the driver. Both the driver and front seat passenger must face forwardly when the vehicle is in motion, but swiveled to face rearwardly when at rest as a lounge. To this end, seating of this type is rotatable and tiltable as well, and it is required that the selected positions be maintained by positive locking action. Heretofore, the hardware to effect these functions has been complicated and correspondingly costly, and it is therefore an object of this invention to provide a simplified and rugged seat unit of the type referred to that positively locks in the selected position, and all to the end that the number of parts, complexity and costs are minimized.

It is an object to provide a most simplified pedestal or supporting column. With the present invention the pedestal is a right cylinder tube projecting from a flat deck plate, and swivel location openings in the tube rotatably locate the chair or seat supported thereby.

It is also an object to provide a most simplified pivot adjustable between upright and reclined positions. With the present invention the pivot involves a right cylinder socket and insert and a stop plate notched for positive positioning between the aforementioned extremes and one or more intermediate positions.

It is another object to provide a most simplified swivel latch. With the present invention a slide bolt is spring biased to project into the aforementioned swivel location openings in the pedestal tube.

It is still another object of this invention to provide a most simplified tilt latch. With the present invention a toggle-pin releasably wedges into the aforementioned stop plate to selectively position the seat inclination.

SUMMARY OF INVENTION

The chair support herein disclosed provides for both swivel and reclining tilt control, and is preferably an articulated assembly of weldments comprised of basic and simple structure forms. The locking functions of both swivel and tilt are positive, and in no instance can the seat pitch forwardly from the normal upright position, nor can the seat fall backwardly beyond the determined extreme tilt position. The hardware unit is adaptable to many chair or seat designs to extend between the supporting deck 10 and underside of the seat 11. As shown, the seat has a back 12, the seat and back being upholstered or cushioned as indicated. As it is illustrated throughout the drawings, the hardware unit involves, generally, a stand or pedestal A, a pivot P rotatably carried upon the pedestal and with a notched plate C for positioned reclination, and a swivel latch L1 and a pivot latch L2 for positive positioning of the seat base B to which the seat is attached.

DRAWINGS

Figure 2:
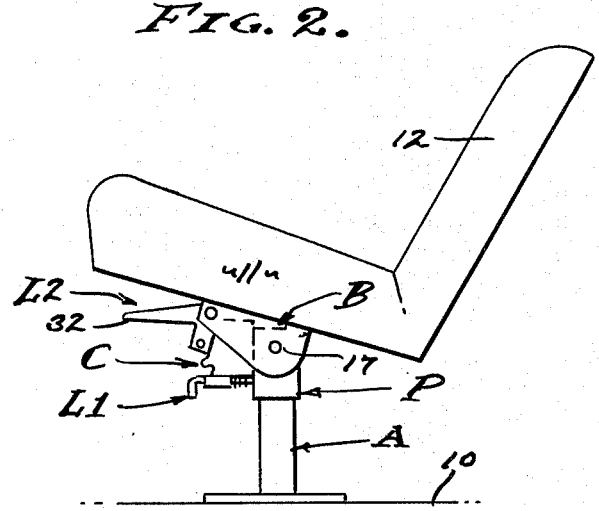

The various objects and features of this invention will be fully understood from the following detailed description of the typical preferred forms and applications thereof, throughout which description reference is made to the accompanying drawings, in which:

FIGS. 1 and 2 are side elevations of typical motor home seating involving the adjustable swivel chair support of the present invention, FIG. 1 showing a normal erect positioning and FIG. 2 showing a reclined position.

Figure 3:
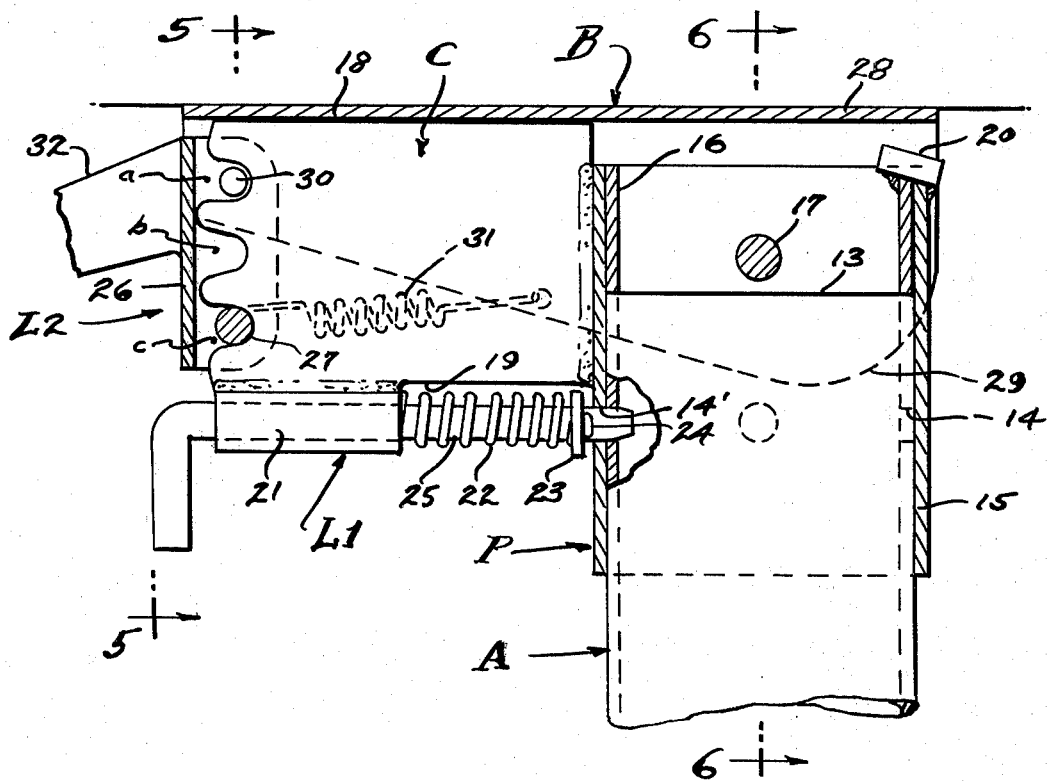

FIGS. 3 and 4 are enlarged detailed views showing the adjustable positions of the hardware, FIG. 3 corresponding to the position thereof in FIG. 1 and FIG. 4 corresponding to the position thereof shown in FIG. 2. And, FIGS. 5 and 6 are transverse sectional views taken as indicated by lines 5—5 and 6—6 in FIG. 3.

PREFERRED EMBODIMENT

Referring now to the drawings, the pedestal A involves a right cylinder column of tube form projecting vertically from a deck plate to which it is secured as by welding. The terminal end 13 of the pedestal is normal to the column axis with forwardly disposed and laterally spaced lock openings 14 on a common horizontal plane. The top terminal end 13 is smooth.

The pivot P is a socket adapted to rotatably engage over the top end portion of the pedestal, and formed of two simple right cylinder tubes and one inserted into the other. The socket is an open ended tube 15 reinforced at its upper end by a stop ring 16 secured in position by a pivot pin 17 extending diametrically through the four walls and welded in position as shown on a horizontal transverse axis.

In accordance with this invention, a fin-shaped stop plate C projects anteriorly from the front side of the socket tube 15 and disposed on the central plane thereof coincidental with the tube axis and normal to the transverse axis of pivot pin 17. As shown, the upper edge 18 of the plate is spaced upward from the upper terminal end of tube 15 and at a normal angle (a right angle as shown) to the tube axis, while the lower edge 19 of the plate is approximately midway between the ends of the tube 15 and also normal and/or at a right angle to the tube axis. Characteristically, the exposed edge of the plate C remote from its welded securement to the tube 15 is notched at $a$, $b$ and $c$, said notches being in a series disposed concentrically about the axis of pivot pin 17. In practice, the notches $a$, $b$, and $c$ are arcuate semi-circular recesses or they can be wedge-shaped for tightness with the latch L2 later described. The edge 18 forms a positive forward or normal position stop, there being a diametrically opposite stop pad 20 to form a positive rearward or reclined position stop.

The swivel latch L1 comprises a spring biased bolt that projects into the spaced latch openings 14 when the upper terminal end 13 of the pedestal is engaged with the stop ring 16. As shown, there is a tubular slide 21 secured as by welding along the edge 19 with a compression spring 22 seated thereagainst to press against a washer 23 bearing upon a cotter 24 placed through the bolt 25. The bolt 25 projects forwardly for manual engagement, with a turned end adapted to be pulled for release, and to rotatably orient the bolt with its terminal end depending, the bolt being retractable through aligned openings 14 and 14' in the pedestal tube and socket tube respectively.

The pivot latch L2 comprises a spring biased shackle 26 that releasably carries a toggle pin 27 into engagement with a notch $a$, $b$, or $c$. The pivot P and shackle 26 are pivoted to a common seat base B in the form of a channel having a seat mounting 28 with spaced parallel depending flanges 29. The shackle 26 is carried by shoulder pins 30 engaged through bearing openings disposed transversely through the flanges 29 on an axis spaced from and parallel to the transverse disposition of the pivot pin 17 through seat flanges 29. In carrying out this invention, the spacing of axes between pins 17 and 30 is equal to or slightly greater than the radius from the pin 17 to the arcuate series of notches $a$, $b$, and $c$. Thus, the shackle 26 has a locking toggle pin 27 at its free moveable end and on an axis spaced from and parallel to the axis of the pin 30, the shackle and toggle pin being biased rearwardly toward notches $a$, $b$, and $c$ by a tension spring 31. The shackle 26 is releasably operated by a lever 32 extended forwardly therefrom, to be shifted manually to lift the toggle pin 27 out of the selective notches.

From the foregoing, it will be seen that the notch $a$ is engaged by pin 27 when the stop edge 18 is engaged with the seat mounting 29; and that notch $b$ is engaged by pin 27 when the pivot P is in an intermediate position. Manual release is effected by simply raising the lever 32 and the selected position secured by release thereof so that the toggle pin 27 moves into wedged engagement within a notch $a$, $b$, or $c$.

Having described only a typical preferred form and application of my invention, I do not wish to be limited or restricted to the specific details herein set forth, but wish to reserve to myself any modifications or variations that may appear to those skilled in the art:

I claim:

1. A reclinably adjustable seat support including, a mounting for supporting engagement with the underside of a seat and having laterally spaced longitudinal flanges depending therefrom carrying spaced fore and aft pivot pins extending therebetween, a pedestal supported member carrying the aft pivot pin and having a vertically disposed stop plate with an upper edge engageable with the underside of the mounting to limit the normal position of the mounting to the pedestal supported pivot, the stop plate projecting forwardly from said member and having a series of angularly displaced notches faced forwardly at a radius substantially the same as the distance between said pivot pins, and a recline latch comprised of a shackle rotatable on the fore pivot pin and having spring means biasing a toggle pin carried at its moveable end into releasable engagement with any one of said series of notches to lock the mounting in position to the pedestal supported member.

2. A removeable and reclinably adjustable seat support including, a mounting for supporting engagement with the underside of a seat and having laterally spaced longitudinal flanges depending therefrom carrying spaced fore and aft pivot pins extending therebetween, a pedestal with a deck support and a top portion of right cylinder form, a pivot member with a socket removeably complementary to and rotatable on said top portion of the pedestal and carrying the aft pivot pin and having a vertically disposed stop plate with an upper edge engageable with the underside of the mounting to limit the normal position of the mounting to the pedestal supported pivot, the stop plate projecting forwardly from said pivot member and having a series of angularly displaced notches faced forwardly at a radius substantially the same as the distance between said pivot pins, and a pivot latch comprised of a shackle rotatable on the fore pivot pin and having spring means biasing a toggle pin carried at its moveable end into releasable engagement with any one of said series of notches to lock the mounting in position to the pedestal supported pivot member.

3. The removeable and reclinably adjustable seat support as set forth in claim 2, wherein the stop plate has a lower edge normal to the axis of the right cylinder socket interengagement of the pivot member and pedestal, and a swivel latch comprised of a slide along said lower edge and a bolt carried thereby into and out of engagement through aligned openings in the pivot member and pedestal respectively.

4. The removeable and reclinably adjustable seat support as set forth in claim 2, wherein the stop plate has a lower edge normal to the axis of the right cylinder socket interengagement of the pivot member and pedestal, and a swivel latch comprised of a slide along said lower edge and a spring biased bolt carried thereby and urged by said spring into engagement through and with aligned openings in the pivot member and pedestal respectively.

5. The removeable and reclinably adjustable seat support as set forth in claim 2, wherein the stop plate has a lower edge normal to the axis of the right cylinder socket interengagement of the pivot member and pedestal, and a swivel latch comprised of a slide along said lower edge and a bolt with a forward extension for manual operation and carried thereby into and out of engagement through aligned openings in the pivot member and pedestal respectively.

6. The removeable and reclinably adjustable seat support as set forth in claim 2, wherein the stop plate has a lower edge normal to the axis of the right cylinder socket interengagement of the pivot member and pedestal, and a swivel latch comprised of a slide along said lower edge and a spring biased bolt with a forward extension for manual operation and carried thereby and urged into engagement through and with aligned openings in the pivot member and pedestal respectively.

* * * * *